(12) United States Patent
Shimada et al.

(10) Patent No.: US 11,868,744 B2
(45) Date of Patent: Jan. 9, 2024

(54) ESTIMATION OF FEATURES CORRESPONDING TO EXTRACTED COMMANDS USED TO DIVIDE CODE OF SOFTWARE

(71) Applicant: NEC Corporation, Tokyo (JP)

(72) Inventors: Yusuke Shimada, Tokyo (JP); Takayuki Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 28 days.

(21) Appl. No.: 17/631,044

(22) PCT Filed: Aug. 8, 2019

(86) PCT No.: PCT/JP2019/031447
§ 371 (c)(1),
(2) Date: Jan. 28, 2022

(87) PCT Pub. No.: WO2021/024472
PCT Pub. Date: Feb. 11, 2021

(65) Prior Publication Data
US 2022/0269490 A1    Aug. 25, 2022

(51) Int. Cl.
*G06F 8/30*     (2018.01)
*G06F 40/205*    (2020.01)

(52) U.S. Cl.
CPC .............. *G06F 8/37* (2013.01); *G06F 40/205* (2020.01)

(58) Field of Classification Search
CPC .................................. G06F 8/37; G06F 40/205
USPC ................................................ 717/120–145
See application file for complete search history.

(56) References Cited

U.S. PATENT DOCUMENTS

| | | | | |
|---|---|---|---|---|
| 5,903,756 | A  * | 5/1999 | Sankar | G06F 8/427 717/106 |
| 7,210,130 | B2 * | 4/2007 | Fairweather | G06F 8/427 717/136 |
| 7,539,976 | B1 * | 5/2009 | Ousterhout | G06F 8/71 717/121 |
| 7,676,788 | B1 * | 3/2010 | Ousterhout | G06F 9/44552 716/110 |
| 8,561,014 | B2 * | 10/2013 | Mengusoglu | G06F 40/205 717/136 |

(Continued)

FOREIGN PATENT DOCUMENTS

| | | |
|---|---|---|
| JP | S61-204737 A | 9/1986 |
| JP | 2005-174045 A | 6/2005 |

(Continued)

OTHER PUBLICATIONS

Joy et al, "Automated Source Code Annotation for Timing Analysis of Embedded Software", IEEE, pp. 1-7 (Year: 2012).*

(Continued)

*Primary Examiner* — Anil Khatri (57) ABSTRACT

A feature estimating device includes a parser identifying means for identifying a parser, the parser being contained in software, for parsing user input and executing a relevant command, a dividing means for extracting commands form a character string in the parser and clustering control flows connecting with the extracted commands as starting points to divide a code of the software for each feature, and a feature estimating means for estimating, based on a characteristic part of each divided code, a feature for each divided code.

6 Claims, 6 Drawing Sheets

(56) References Cited

U.S. PATENT DOCUMENTS

| | | | | |
|---|---|---|---|---|
| 8,707,252 | B1* | 4/2014 | Alexeev | G06F 8/427 717/136 |
| 8,788,263 | B1* | 7/2014 | Richfield | G06F 40/205 704/9 |
| 9,928,379 | B1* | 3/2018 | Hoffer | G16H 50/20 |
| 10,191,973 | B1* | 1/2019 | Bent | G06F 16/35 |
| 10,469,275 | B1* | 11/2019 | Broomall | H04L 51/52 |
| 10,762,200 | B1* | 9/2020 | Salem | G06F 21/54 |
| 10,957,310 | B1* | 3/2021 | Mohajer | G06F 8/31 |
| 2010/0042585 | A1* | 2/2010 | Adler | G06F 16/28 717/139 |

FOREIGN PATENT DOCUMENTS

| | | |
|---|---|---|
| JP | 2016-081132 A | 5/2016 |
| JP | 2017-156896 A | 9/2017 |
| JP | 2019-106128 A | 6/2019 |

OTHER PUBLICATIONS

Allamanis, et al, "Mining Idioms from Source Code", ACM, pp. 472-483 (Year: 2014).*
Chen et al, "Feature Subset Selection Can Improve Software Cost Estimation Accuracy", ACM, pp. 1-6 (Year: 2005).*
Hosni et al, "Investigating Heterogeneous Ensembles with Filter Feature Selection for Software Effort Estimation", ACM, pp. 1-14 (Year: 2017).*
Sigweni et al, "Feature Weighting for Case-Based Reasoning Software Project Effort Estimation", ACM, pp. 1-4 (Year: 2014).*
Hammad et al, "Features-Level Software Effort Estimation Using Machine Learning Algorithms", IEEE, pp. 1-4 (Year: 2018).*
International Search Report for PCT Application No. PCT/JP2019/031447, dated Oct. 21, 2019.

* cited by examiner

ESTIMATION OF FEATURES CORRESPONDING TO EXTRACTED COMMANDS USED TO DIVIDE CODE OF SOFTWARE

This application is a National Stage Entry of PCT/JP2019/031447 filed on Aug. 8, 2019, the contents of all of which are incorporated herein by reference, in their entirety.

TECHNICAL FIELD

The present invention relates to a software feature estimating device, a software feature estimating method, and a computer-readable medium.

BACKGROUND ART

There is a known technique for analyzing software. Patent Literature 1 discloses a technique of weighting words in a class or a method and clustering constituent elements of software based on the weighting result.

CITATION LIST

Patent Literature

Patent Literature 1: Japanese Unexamined Patent Application Publication No. 2017-156896

SUMMARY OF INVENTION

Technical Problem

In recent years, infrastructures and enterprise systems have been complicated. Thus, these infrastructures and enterprise systems are generally built by combining devices of various companies. For these reasons, manufacturers that manage the building of infrastructures and enterprise systems need to inspect software procured from outside manufacturers. Although an executable code (binary code) or a source code of software procured from the outside is provided to inspect the software, it has been difficult to accurately easily and automatically grasp what features are implemented in the software to be inspected.

In view of the above problems, a purpose of the present disclosure is to provide a feature estimating device that solves any of the problems.

Solution to Problem

A feature estimating device according to a first aspect of the present invention includes a parser identifying means for identifying a parser, the parser being contained in software, for parsing user input and executing a relevant command, a dividing means for extracting commands from a character string in the parser and clustering control flows connecting with the extracted commands as starting points to divide a code of the software for each feature, and a feature estimating means for estimating, based on a characteristic part of each divided code, a feature for each divided code.

A feature estimating method according to a second aspect of the present invention includes the steps of identifying a parser, the parser contained in software, for parsing user input and executing a relevant command, extracting commands from a character string in the parser and clustering control flows connecting with the extracted commands as starting points to divide a code of the software for each feature, and estimating, based on a characteristic part of each divided code, a feature for each divided code.

A non-transitory computer-readable medium according to a third aspect of the present invention stores a program causing a computer to execute the steps of identifying a parser, the parser contained in software, for parsing user input and executing a relevant command, extracting commands from a character string in the parser and clustering control flows connecting with the extracted commands as starting points to divide a code of the software for each feature, and estimating, based on a characteristic part of each divided code, a feature for each divided code.

Advantageous Effects of Invention

According to the present invention, it is possible to estimate features contained in software from a code to be able to accurately easily inspect the code of the software for each feature.

DESCRIPTION OF EMBODIMENTS

Hereinafter, example embodiments of the present invention will be described with reference to the drawings. The following description and the drawings are appropriately omitted or simplified to clarify the explanation. In the drawings, the same elements are denoted by the same reference signs, and duplicated descriptions are omitted as necessary.

First Example Embodiment

A first example embodiment will be described below.

Figure 1:
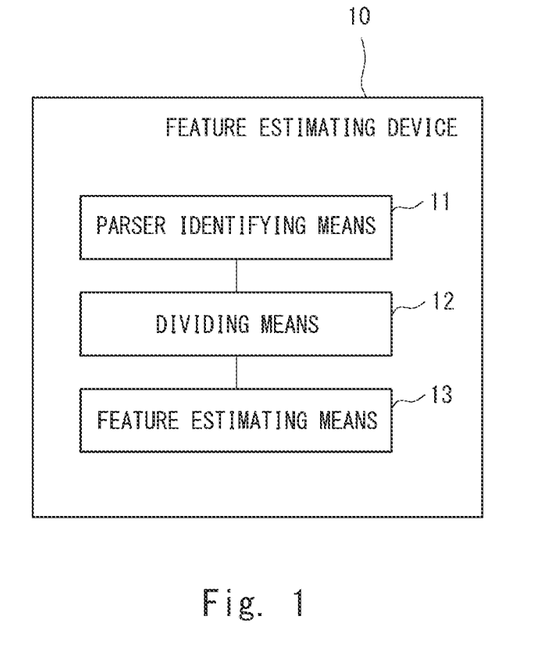
FIG. 1 is a block diagram showing a configuration of a feature estimating device according to a first example embodiment.

FIG. 1 is a block diagram showing a configuration of a feature estimating device 10 according to a first example embodiment. As shown in FIG. 1, the feature estimating device 10 includes a parser identifying means 11, a dividing means 12, and a feature estimating means 13.

The parser identifying means 11 identifies a parser contained in software. Here, a parser is for parsing user input and executing a relevant command. The dividing means 12 extracts commands from a character string in the parser and clusters control flows connecting with the extracted commands as starting points to divide a code of the software for each feature. The feature estimating means 13 estimates a feature for each divided code based on a characteristic part of each divided code.

It is possible to estimate features contained in software from a code to be able to accurately easily inspect the code of the software for each feature.

Second Example Embodiment

A second example embodiment will be described below.

Figure 2:
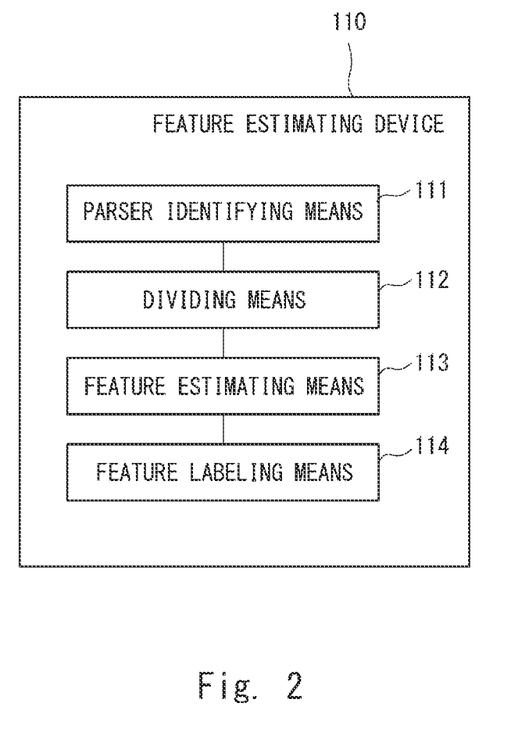
FIG. 2 is a block diagram showing a configuration of a feature estimating device according to a second example embodiment.

First, a configuration example of a feature estimating device according to the second example embodiment is described. FIG. 2 is a block diagram showing a configuration of a feature estimating device 110 according to the second example embodiment. As shown in FIG. 2, the feature estimating device 110 includes a parser identifying means 111, a dividing means 112, a feature estimating means 113, and a feature labeling means 114.

The parser identifying means 111 identifies a parser contained in software and for parsing user input and executing a relevant command. Note that, a method for identifying a parser in a code of software may be a known method of, for example, searching for a characteristic function used in the parser. The dividing means 112 extracts commands from a character string in the parser and clusters control flows connecting with the extracted commands as starting points to divide a code of the software for each feature. The feature estimating means 113 estimates, based on a characteristic part of each divided code, a feature for each divided code. The feature labeling means 114 labels each divided code with the feature estimated by the feature estimating means 113.

In the above description, the control flows are clustered using the extracted commands as the starting points, but control flows to be validated by settings may be clustered using setting items of the software as starting points instead of the commands. In this case, the parser is for parsing setting information and controlling validity/invalidity of the control flows depending on the settings.

Next, a procedure of processing of estimating a feature for each divided code in the feature estimating device 110 is described. Note that, FIG. 2 is appropriately referred to in the following description.

Figure 3:
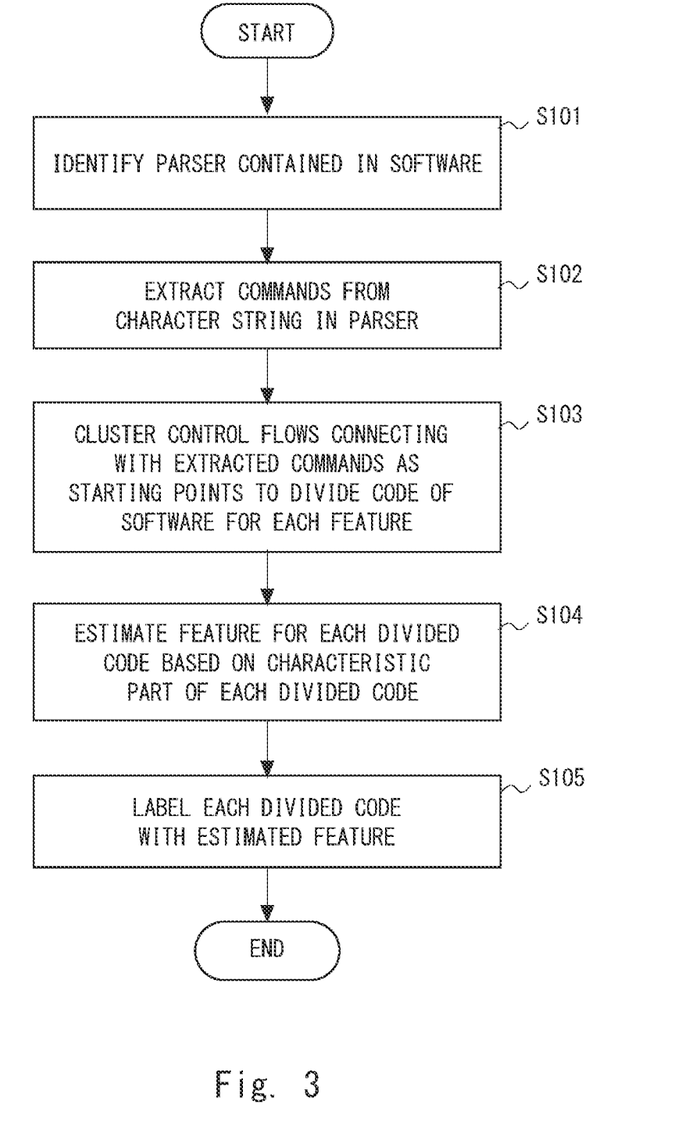
FIG. 3 is a flowchart for explaining a procedure of processing of estimating a feature for each divided code in the feature estimating device according to the second example embodiment.

FIG. 3 is a flowchart for explaining a procedure of processing of estimating a feature for each divided code in the feature estimating device 110. As shown in FIG. 3, first, the parser identifying means 111 identifies a parser contained in software (step S101). Then, the dividing means 112 extracts commands from a character string in the parser (step S102). Then, the dividing means 112 clusters control flows connecting with the extracted commands as starting points to divide a code of the software for each feature (step S103). Then, the feature estimating means 113 estimates, based on a characteristic part of each divided code, a feature for each divided code (step S104). Then, the feature labeling means 114 labels each divided code with the feature estimated by the feature estimating means 113 (step S105).

Figure 4:
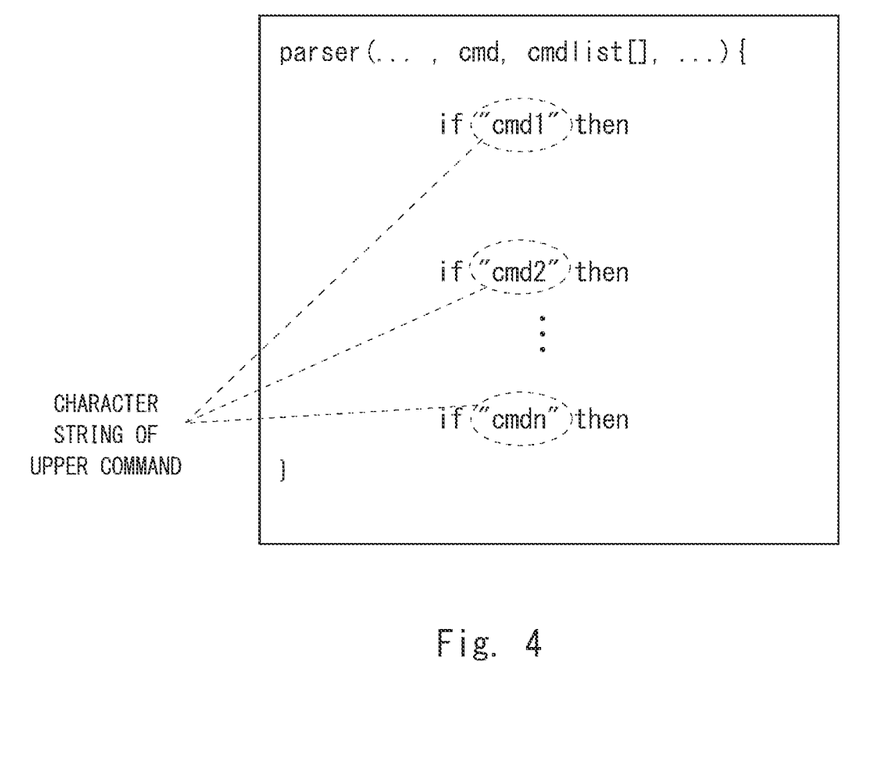
FIG. 4 is a diagram for explaining processing of extracting commands from a character string in a parser in step S102 of FIG. 3.

FIG. 4 is a diagram for explaining the processing of extracting commands from a character string in a parser in step S102 of FIG. 3. As shown in FIG. 4, if a subject to be inspected is a source code, the code about a parser contains a conditional statement (for example, an if statement or a switch-case statement) for executing an upper command (an upper command k; k=1 to n) input by a user. If a subject to be inspected is a binary, a character string of an upper command is in a reference destination of an instruction for comparing character strings or the like. That is, the code about the parser contains all the character strings of the upper command to be directly executed by the parser. Thus, when character strings of a command are extracted from the code about the parser, the character strings of an upper command 1, an upper command 2, . . . , and an upper command n are "cmd1", "cmd2", . . . , and "cmdn", respectively.

Figure 5:
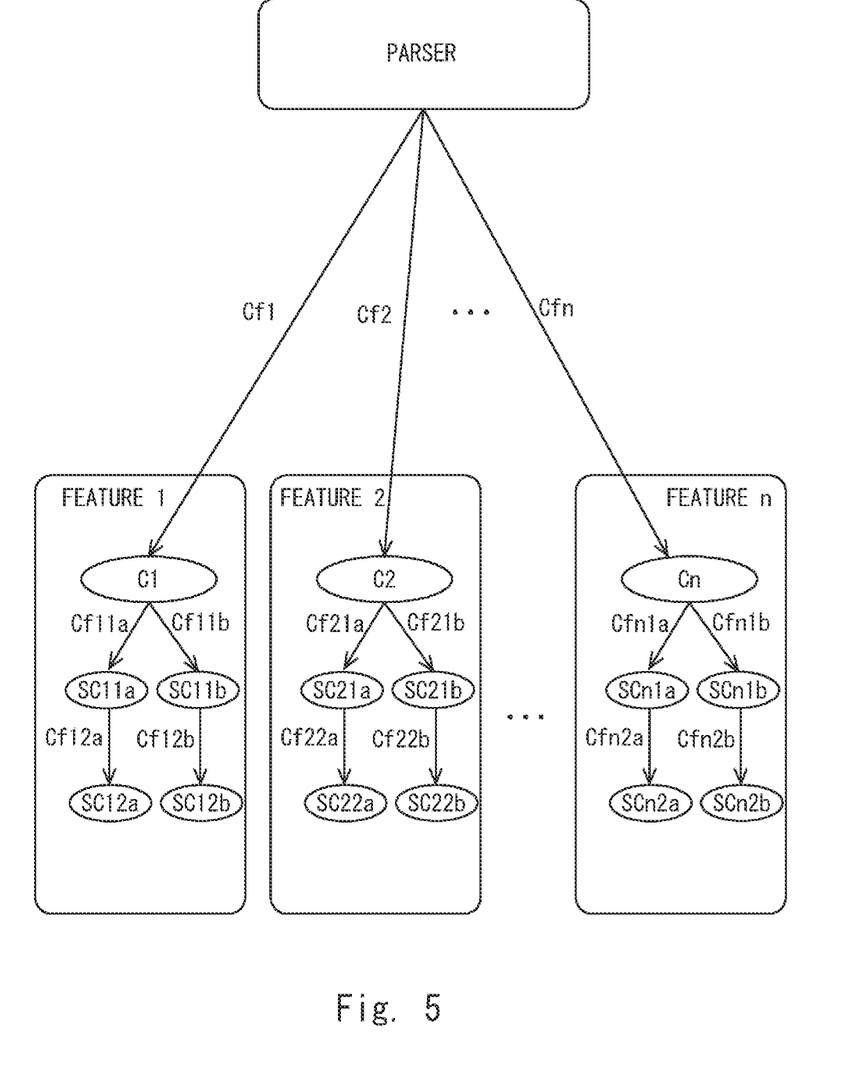
FIG. 5 is a diagram for explaining processing of dividing a code of software for each feature by clustering control flows connecting with the extracted commands as starting points in step S103 of FIG. 3.

FIG. 5 is a diagram for explaining the processing of dividing a code of software for each feature by clustering control flows connecting with the extracted commands as starting points in step S103 of FIG. 3. FIG. 5 shows an example of a control flow graph of software to be analyzed. Here, the control flow graph is a graph representing all possible paths that are passed through when the software is executed.

In the example shown in FIG. 5, a control flow Cfk (k=1 to n) from the parser extends to an upper command Ck (k=1 to n). A control flow Cfk1a (k=1 to n) from the upper command Ck extends to a first layer subcommand SCfk1a (k=1 to n), and a control flow Cfk1b (k=1 to n) from the upper command Ck extends to a first layer subcommand SCfk1b (k=1 to n). In addition, a control flow Cfk2a from the first layer subcommand SCfk1 a extends to a second layer subcommand SCfk2a (k=1 to n), and a control flow Cfk2b from the first layer subcommand SCfk1b extends to a second layer subcommand SCfk2b (k=1 to n).

That is, control flows from the parser extend to upper commands (parent commands). Then, control flows extend from each upper command to first layer subcommands (child commands), and further extend from the first layer subcommands to second layer subcommands (grandchild commands). Except for a special case, it is assumed that, in general software, control flows extending from a parser connect with downstream subcommands through upper commands as described above.

Control flows that can be traced from an upper command are clustered as a cluster of the upper command. In the example shown in FIG. 5, the control flow Cfk1a, the control flow Cfk1b, the control flow Cfk2a, and the control flow Cfk2b are clustered as the feature k (k=1 to n).

A divided code of a feature corresponding to a first command, which is one of the upper commands, contains the codes of all the subcommands through which the control flows that can be traced downstream from the first command as a starting point. The code of the first command and the codes of the subcommands through which the control flows clustered as a cluster of the first command pass are assumed to be a divided code of one feature contained in the software.

That is, in the example shown in FIG. 5, the divided code of the feature k corresponding to the upper command Ck contains the codes of the first layer subcommand SCfk1a, the first layer subcommand SCfk1b, the second layer subcommand SCfk2a, and the second layer subcommand SCfk2b. The code of the upper command Ck, and the codes of the subcommands through which the control flows clustered as a cluster of the upper command Ck pass are assumed to be a divided code of one feature contained in the software.

In this manner, by clustering control flows connecting with upper commands as starting points, it is possible to identify the range of each feature contained in software (in the example shown in FIG. 5, the feature k; k=1 to n). Note that, for convenience of explanation, the number of first layer subcommands to which the control flows from an upper command is two, and the number of second layer subcommands to which the control flows from the first layer subcommands is two in the example shown in FIG. 5, but those numbers are not limited to two. In addition, for convenience of explanation, the number of subclaim layers is two in the example shown in FIG. 5, but the number of subclaim layers is not limited to two.

Figure 6:
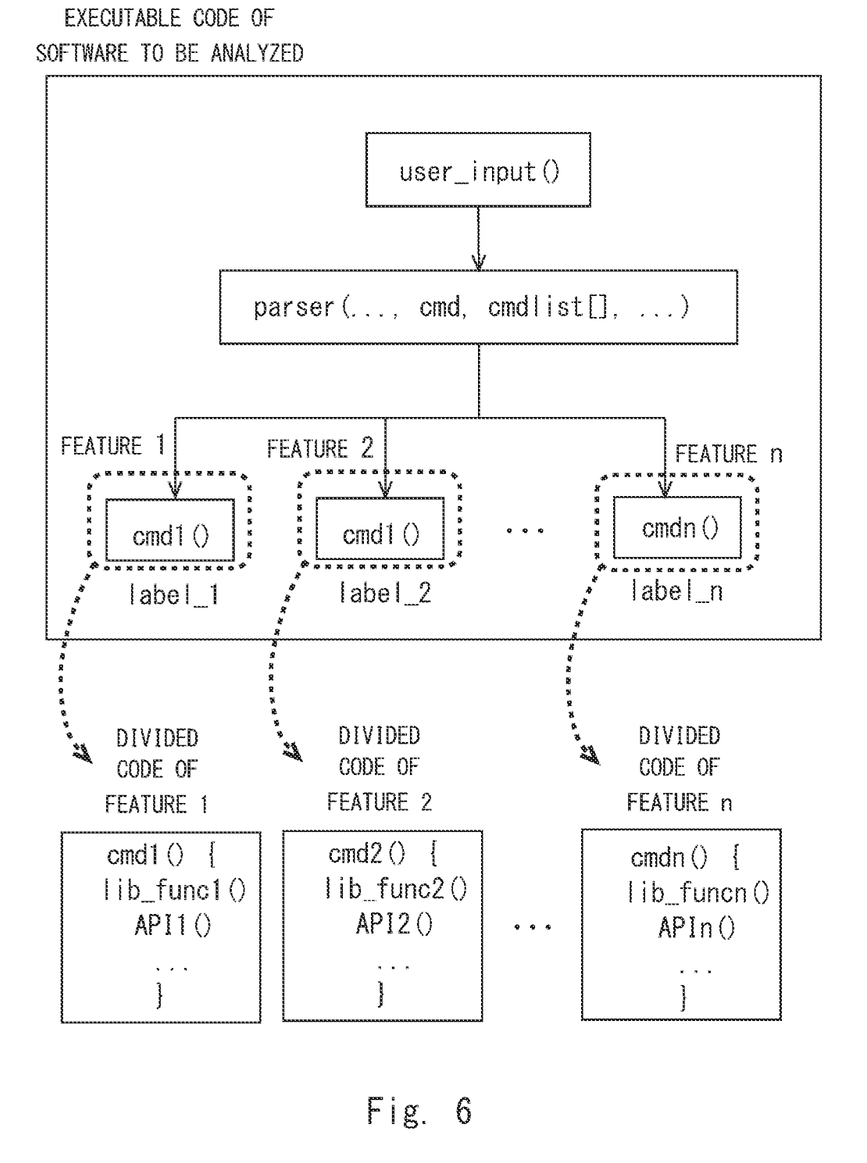
FIG. 6 is a diagram for explaining processing in steps S104 and S105 of FIG. 3.

FIG. 6 is a diagram for explaining the processing in steps S104 and S105 of FIG. 3. As shown in FIG. 6, a divided code for each feature contains a name of a command, a name of a function corresponding to the command, a user-defined function called inside the function, a library function, and a characteristic part such as an API. However, if a subject to be inspected is a stripped binary, a name of a function cannot be used. A feature contained in the software can be estimated based on at least one of a name of a command, a name of a function corresponding to the command, a user-defined function called inside the function, a library function, an API, a system call, and an instruction that are contained in the divided code of the feature. Then, the estimated feature is labeled. In the example shown in FIG. 6, the feature of the feature k (k=1 to n) is labeled as a label_k (k=1 to n).

In the estimation of a feature of the software in step S104 of FIG. 3, information about an API to be called when the divided code is executed may be taken into consideration. In addition, in the estimation of a feature of the software in step S104 of FIG. 3, information about a state of file access when the divided code is executed may be taken into consideration. With the consideration, it is possible to further improve the accuracy of estimation of a feature.

From the above, since the feature estimating device 110 divides a code on the basis of upper commands whose control flows directly connecting with a parser, dividing accuracy of features is high. Here, high dividing accuracy means that all codes related to a feature are contained and that no code unrelated to the features is contained. With the feature estimating device 110, dividing accuracy of functions is high, and it is possible to estimate features contained in software from a code to be able to accurately easily inspect the code of the software for each feature.

In the above example embodiments, the present invention is described as a hardware configuration, but the present invention is not limited thereto. The present invention can be achieved by a central processing unit (CPU) executing a program.

The program for performing the processing of estimating a feature for each divided code can be stored by various types of non-transitory computer-readable media and provided to a computer. Non-transitory computer readable media include any type of tangible storage media. Examples of non-transitory computer readable media include magnetic storage media (such as flexible disks, magnetic tapes, hard disk drives, etc.), optical magnetic storage media (such as magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, and Random Access Memory (RAM)). The program may be provided to a computer using any type of transitory computer readable media. Examples of transitory computer readable media include electric signals, optical signals, and electromagnetic waves. Transitory computer readable media can provide the program to a computer via a wired communication line (such as electric wires, and optical fibers) or a wireless communication line.

The present invention has been described above with reference to the example embodiments but is not limited by the above. Various modifications that can be understood by those skilled in the art can be made to the configurations and the details of the present invention without departing from the scope of the invention. The software to be analyzed in the above example embodiments may be executable codes or source codes. In addition, the software to be analyzed may be a single code or codes containing a library loaded from the outside.

REFERENCE SIGNS LIST 10, 110 Feature estimating device
11, 111 Parser identifying means
12, 112 Dividing means
13, 113 Feature estimating means
114 Feature labeling means

What is claimed is:

1. A feature estimating device comprising:
at least one processor; and
at least one memory storing instructions executable by the processor to
identify a parser, the parser being contained in software, for parsing user input and executing a relevant command;
extract upper commands to be directly executed by the parser, from a character string in the parser;
cluster control flows connecting with the extracted upper commands as starting points to divide code of the software for each of a plurality of features of the software;
estimate each of the plurality of features based on a characteristic part of the divided code for the feature, and
based on information about an application programming interface (API) to be called when the divided code for the feature is executed; and
perform code inspection on the code of the software for each of the plurality of features that has been estimated, wherein
the upper commands include a first command as a first starting point of the starting points,
the plurality of features include a first feature corresponding to the first command, and
the divided code for the first feature contains the code of the software, including all subcommands, through which the control flows are traceable downstream from the first command as the first starting point.

2. The feature estimating device according to claim 1, wherein the characteristic part of the divided code for each of the plurality of features contains at least one of a name of a corresponding command, a name of a function corresponding to the corresponding command, a user-defined function called inside the function, a library function, a system call, and an instruction contained in the divided code.

3. The feature estimating device according to claim 1, wherein each of the plurality of features is estimated based on information about an application programming interface (API) to be called when the divided code for the feature is executed.

4. The feature estimating device according to claim 1, wherein each of the plurality of features is estimated based further on information about a state of file access when the divided code for the feature is executed.

5. A feature estimating method comprising:
identifying, by a processor, a parser, the parser being contained in software, for parsing user input and executing a relevant command;
extracting, by the processor, upper commands to be directly executed by the parser, from a character string in the parser;

clustering, by the processor, control flows connecting with the extracted upper commands as starting points to divide code of the software for each of a plurality of features of the software;

estimating each of the plurality of features, by the processor, based on a characteristic part of the divided code for the feature, and based on information about an application programming interface (API) to be called when the divided code for the feature is executed; and performing, by the processor, code inspection on the code of the software for each of the plurality of features that has been estimated, wherein the upper commands include a first command as a first starting point of the starting points, the plurality of features include a first feature corresponding to the first command, and the divided code for the first feature contains the code of the software, including all subcommands, through which the control flows are traceable downstream from the first command as the first starting point.

6. A non-transitory computer-readable medium storing a program executable by a computer to perform:

identifying a parser, the parser being contained in software, for parsing user input and executing a relevant command;

extracting upper commands to be directly executed by the parser, from a character string in the parser;

clustering control flows connecting with the extracted upper commands as starting points to divide code of the software for each of a plurality of features of the software;

estimating each of the plurality of features based on a characteristic part of the divided code for the feature, and based on information about an application programming interface (API) to be called when the divided code for the feature is executed; and performing code inspection on the code of the software for each of the plurality of features that has been estimated, wherein the upper commands include a first command as a first starting point of the starting points, the plurality of features include a first feature corresponding to the first command, and the divided code for the first feature contains the code of the software, including all subcommands, through which the control flows are traceable downstream from the first command as the first starting point.

* * * * *